United States Patent [19]
Verbo et al.

[11] Patent Number: 5,167,180
[45] Date of Patent: Dec. 1, 1992

[54] PROCESS FOR ADJUSTING THE VALUE OF THE JUMP OF A PNEUMATIC BRAKE-BOOSTER AND BOOSTER FOR CARRYING OUT THIS PROCESS

[75] Inventors: Ulysse Verbo; Jean-Pierre Gautier, both of Aulnay-sous-Bois, France

[73] Assignee: Bendix Europe Services Techniques, Drancy, France

[21] Appl. No.: 726,668

[22] Filed: Jul. 8, 1991

[30] Foreign Application Priority Data

Jul. 31, 1990 [FR] France .................. 90 09750

[51] Int. Cl.$^5$ ............................ F01B 25/00
[52] U.S. Cl. .................. 91/471; 91/376 R; 60/327
[58] Field of Search .............. 91/369.1, 369.2, 369.3, 91/376 R, 471; 60/327

[56] References Cited

U.S. PATENT DOCUMENTS

| | | | |
|---|---|---|---|
| 4,934,249 | 6/1990 | Gautier | 91/369.3 |
| 4,984,506 | 1/1991 | Perez | 91/369 |

FOREIGN PATENT DOCUMENTS

| | | |
|---|---|---|
| 340059 | 11/1989 | European Pat. Off. |
| 352392 | 1/1990 | European Pat. Off. |
| 3510844 | 10/1986 | Fed. Rep. of Germany |
| 2074270 | 10/1981 | United Kingdom |

*Primary Examiner*—Edward K. Look
*Assistant Examiner*—Todd Mattingly
*Attorney, Agent, or Firm*—Larry J. Palguta; Ken C. Decker

[57] ABSTRACT

In the booster are mounted movably a hollow booster piston (20) and a control rod (30) carrying a plunger (28) seated in the piston (20), the rear end of the plunger (28) forming a first annular valve seat (28a) concentric with a second annular valve seat (20a) carried by the booster piston (20), the first valve seat (28a) and second valve seat (20a) interacting with an annular shutter (34) carried by the booster piston (20), and a reaction disk (48) being interposed between an annular front face (20b) of the booster piston (20) and a rear face of a push rod (46). The process for adjusting the value of the pump of the booster comprises the following steps:

applying to the push rod (46) a force equal to the boost force corresponding to the desired jump of the booster, moving the seat (20a) of the booster piston (20) away from the shutter (34), putting the front face of the plunger (28) and the rear face of the reaction disk (48) into contact and maintaining this contact during the next step.

putting the seat (20a) of the booster piston (20) into contact with the shutter (34) in order to move the latter away from the plunger seat (28a), and releasing the force applied to the push rod (46).

10 Claims, 2 Drawing Sheets

PROCESS FOR ADJUSTING THE VALUE OF THE JUMP OF A PNEUMATIC BRAKE-BOOSTER AND BOOSTER FOR CARRYING OUT THIS PROCESS

BACKGROUND OF THE INVENTION

The present invention relates to brake-boosters, especially for motor vehicles, and applies more particularly to adjusting the jump of such boosters.

A brake-booster, as defined above, generally comprises a control rod which is displaced towards the front of the vehicle when its driver actuates the brake pedal. This displacement of the control rod is transmitted to an element called a plunger which in turn actuates boosting means. In general, these boosting means consist of a three-way valve, the function of which is to interrupt communication between the front and rear chambers of the booster, in which the same reduced pressure prevails in the rest position, and to put the rear chamber in relationship with a source of pressure under a higher pressure, so as to generate a pressure difference on the two faces of a piston separating these two chambers. The piston is then displaced forwards, being fixed to an output rod or push rod which in turn acts on a master cylinder then generating a pressure increase in the hydraulic brake circuit of the vehicle, in order to brake the latter.

In a known way, the piston serving for transmitting the boost force to the output rod or push rod acts on the latter via a reaction disk produced from a deformable material, such as an elastomer. At rest, a slight play is present between the front end of the plunger and the reaction disk. The rear end of the plunger forms an annular valve seat coaxial with another annular valve seat formed on the piston, a shutter-forming member interacting with these valve seats.

In such boosters, the reaction at the brake pedal begins to appear only when the boost force generated by the booster exceeds a particular threshold. This threshold is called the "jump" of the booster. It is an important feature of the booster. In fact, although it is necessary for the jump to be present in order to ensure an immediate response of the brakes whenever the pedal is actuated, vehicle manufacturers generally want the value of this jump to remain within particular limits, so that the boost does not reach too high a value without an increase in the reaction of the brake pedal.

However, particularly in view of the production tolerances of the various component parts of the booster, there can be considerable differences in the value of the jump from one booster to another in series production.

The document GB-A-2 074 270 makes known a process for adjusting the value of the jump of a booster, according to which process the play present between the front face of the plunger and the reaction disk is adjusted. This process has many disadvantages, in that it is long and complicated and, moreover, to carry it out it requires the use of ultrasonic or heating means for subjecting to plastic deformation a valve part comprising an additional component between the plunger and the reaction disk. The major disadvantage of this process is, furthermore, that the adjustment has to be made before the reaction disk and consequently the booster itself is assembled. As a result of this, the various components have to be paired with great care.

SUMMARY OF THE INVENTION

An object of the present invention is, therefore, to provide a process for adjusting the value of the jump of a booster, which is carried out simply and quickly, reliably and at low outlay and which, furthermore, can be applied to a booster after its assembly.

To achieve this, the present invention provides a process for adjusting the value of the jump of a brake-booster, in which booster are mounted movably a hollow booster piston and a control rod carrying a plunger seated in the piston, the rear end of the plunger forming a first annular valve seat concentric with a second annular valve seat carried by the booster piston, the first and second valve seats interacting with an annular shutter carried by the booster piston, and a reaction disk being interposed between an annular front face of the booster piston and a rear face of a push rod, said process being characterized in that it comprises the following steps:

- applying to the push rod a force equal to the boost force corresponding to the desired jump of the booster,
- moving the seat of the booster piston away from the shutter,
- putting the front face of the plunger and the rear face of the reaction disk into contact and maintaining this contact during the next step,
- putting the seat of the booster piston into contact with the shutter in order to move the latter away from the first seat, and
- releasing the force applied to the push rod.

Another object of the present invention is to provide a brake-booster, the jump of which can be adjusted simply, quickly, reliably and at low outlay, this adjustment being realizable on the already assembled booster.

To achieve this, the present invention provides a brake-booster, in which are mounted movably a hollow booster piston and a control rod carrying a plunger seated in a rear tubular part of the piston, the rear end of the plunger forming a first annular valve seat concentric with a second annular valve seat carried by the booster piston, the first and second valve seats interacting with an annular shutter carried by the booster piston, and a reaction disk being interposed between an annular front face of the booster piston and a rear face of a push rod, characterized in that the position of the second valve seat in relation to the annular front face of the booster piston is adjustable.

BRIEF DESCRIPTION OF THE DRAWING

A particular embodiment of the present invention will now be described by way of illustrative example with reference to the accompanying drawings in which.

the FIG. 1 is a side view in longitudinal section showing the central part of a brake-booster of which the value of the jump can be adjusted according to the invention.

DETAILED DESCRIPTION OF THE INVENTION

Figure 1:
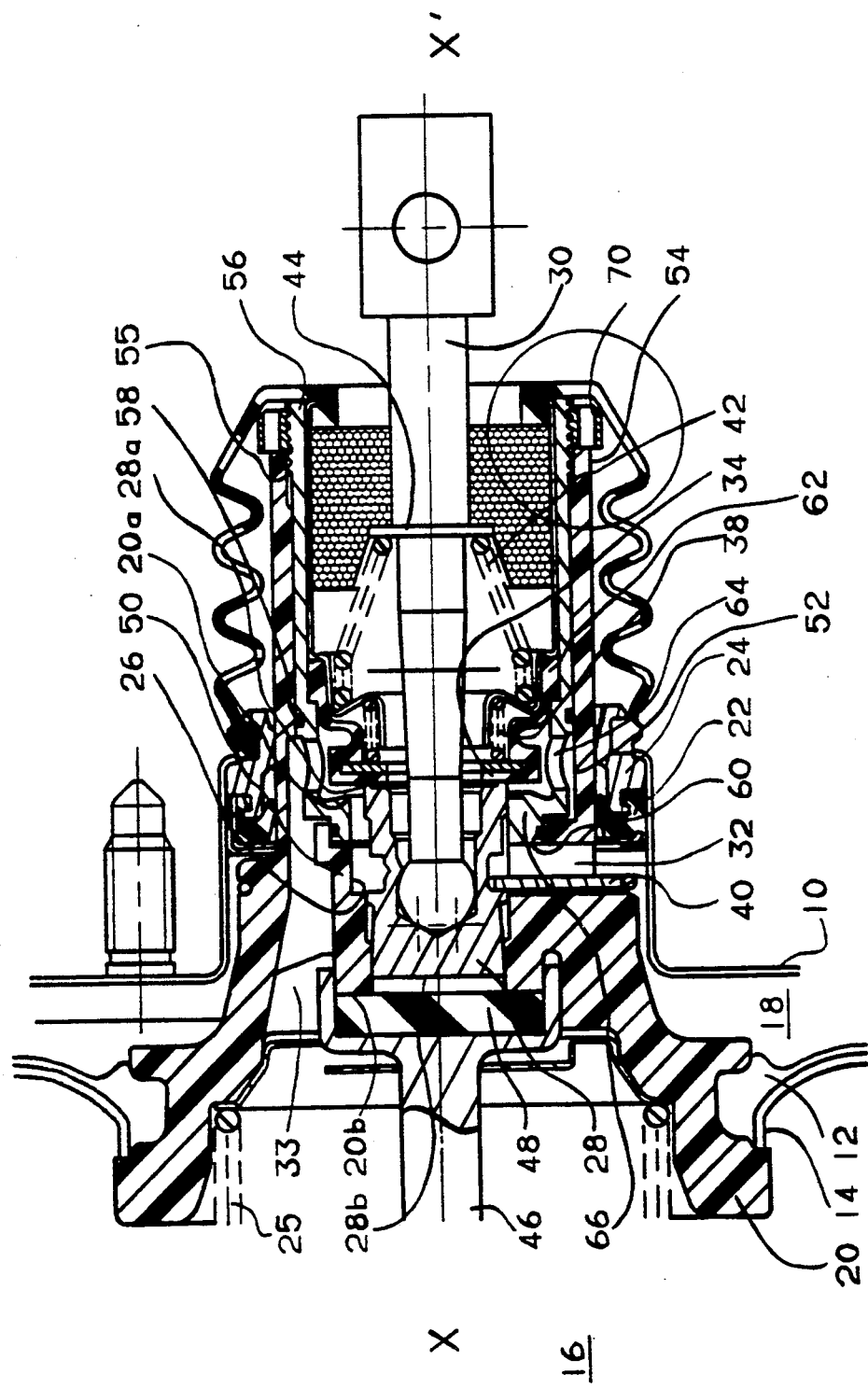
Figure 2:
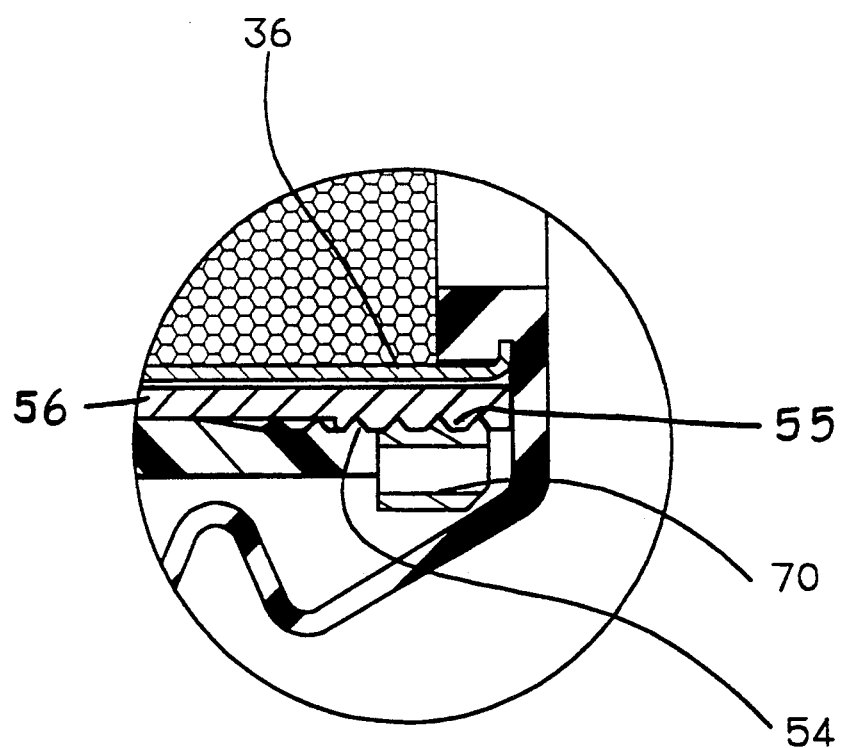
FIG. 2 is an enlarged view of the circled portion of FIG. 1.

The FIGURE shows, in section, the central part of a brake-booster intended to be arranged conventionally between the brake pedal of a vehicle and the master cylinder controlling the hydraulic brake circuit of this vehicle. By convention, the part of the booster facing the master cylinder is called the "front" of the booster and the part facing the brake pedal the "rear" of the booster. In the FIGURE, the front is on the left and the rear is on the right.

The booster of the FIGURE comprises an outer shell-shaped casing 10 having rotational symmetry about an axis X—X. Only the rear central part of this casing 10 is shown in the FIGURE.

A flexible elastomeric diaphragm 12 reinforced in its central part by a metal supporting disk 14 defines, within the space delimited by the casing 10, a front chamber 16 and a rear chamber 18. The outer peripheral edge (not shown) of the diaphragm 12 is fastened sealingly to the outer casing 10. The inner peripheral edge of this same diaphragm terminates in a bead received sealingly in an annular groove formed on the outer peripheral surface of a hollow booster piston 20 arranged along the axis X—X of the booster. This hollow piston 20 is extended rearwards by a tubular part which passes sealingly through the rear wall of the casing 10. The sealing of this passage is ensured by a reinforced annular gasket 22 which is fastened by means of a ring 24 in a tubular central part extending rearwards the rear wall of the casing 10.

A compression spring 25 interposed between the piston 20 and the front wall (not shown) of the outer casing 10 normally keeps the piston in its rear rest position, illustrated in the FIGURE, in which the rear chamber 18 is of minimum volume and the front chamber 16 of maximum volume.

In its central part located between the tubular rear part and the front part in which the diaphragm 12 is fastened, the piston 20 has a stepped bore 26, in which is slideably received a plunger 28 likewise having rotational symmetry about the axis X—X. The front end of a control rod 30 of the booster, likewise arranged along the axis X—X, is mounted in the manner of a ball joint in the plunger 28. The rear end of this rod 30, which projects outside the tubular part of the piston 20, is controlled directly by the brake pedal of the vehicle.

The annular space located between the control rod 30 and the tubular part of the piston communicates with the outside at the rear of the booster. Towards the front, this same annular space can communicate with the rear chamber 18 by way of a radial passage 32 formed in the central part of the piston, when a three-way valve is actuated. This three-way valve comprises an annular shutter 34 mounted in the tubular part of the piston and two annular valve seats 20a and 28a formed respectively on the central part of the piston 20 and on the plunger 28.

The shutter 34 forms the front end, of smaller diameter, of a flexible elastomeric sleeve, the rear end of which terminates in a bead mounted sealingly inside the tubular part of the piston 20. This bead is kept in place by a metal cup 36, on which bears a compression spring 38 tending to displace the shutter 34 forwards.

The annular valve seat 28a is formed on the rear end face of the plunger 28. In a comparable way, the valve seat 20a is formed on the rear end face of the central part of the piston 20 around the seat 28a. Depending on the position of the plunger 28 within the piston 20, this arrangement allows the shutter 34 constantly to bear sealingly on at least one of the valve seats 28a and 20a under the action of the spring 38.

A second passage 33 is formed in the central part of the piston 20 approximately in parallel with its axis X—X, to put the front chamber 16 of the booster in communication with an annular chamber formed around the shutter 34 within the tubular part of the piston. When the plunger 28 occupies its rear rest position, illustrated in the FIGURE, in which the shutter 34 bears sealingly on the seat 28a of the plunger and is away from the seat 20a of the piston, the front chamber 16 and rear chamber 18 of the booster thus communicate with one another via the passages 33 and 32.

In a known way, at least one stop member 40 mounted in the central part of the piston 20 delimits the axial stroke of the plunger 28 within the latter. The plunger 28 is normally maintained in its rear rest position defined by the member 40 by means of a compression spring 42 interposed between the cup 36 and a washer 44, the washer 44 itself bearing on a shoulder formed on the control rod 30.

In its central part, the piston 20 comprises an annular front face 20b, in the center of which the bore 26 opens out. This annular front face 20b of the piston 20 acts on the rear face of a push rod 46 via a reaction disk 48 made of a deformable material, such as an elastomer. More specifically, the push rod 46 and the reaction disk 48 are arranged along the axis X—X of the booster in the extension of the control rod 30 and of the plunger 28.

When the booster is installed on a vehicle, the front chamber 16 communicates permanently with a vacuum source.

In a first phase, the depression of the brake pedal by the vehicle driver has the effect of equalizing the prestressing force of the spring 42, less the prestressing force of the spring 38. During the slight displacement which follows, the front chamber 16 and rear chamber 18 of the booster are then isolated from one another. In this first phase of actuation of the booster, the force exerted on the control rod 30 does not generate any force on the push rod 46 at the exit of the booster.

In a second phase of actuation of the brake, the plunger is displaced sufficiently forwards to ensure that the shutter 34 is in sealing contact with the seat 20a of the piston and is spaced from the seat 28a of the plunger. Under these conditions, the rear chamber 18 of the booster is isolated from the front chamber 16 and communicates with the atmosphere. A boost force is thus generated, tending to displace the piston 20 forwards. This displacement is transmitted to the push rod 46 by the reaction disk 48.

During this second phase of actuation of the brakes, the boost force exerted by the piston 20 does not deform the reaction disk 48 sufficiently to ensure that the latter completely fills the space initially separating it from the plunger 28. Consequently, the output force applied to the master cylinder by the output rod 46 increases abruptly, while the force exerted on the control rod 30 remains unchanged.

This abrupt increase in the output force corresponds to the jump of the booster, that is to say to the threshold beyond which the boost force generated in the booster and exerted on the reaction disk 48 by the piston 20 becomes sufficient to ensure that the front face 28b of the plunger comes into contact with the reaction disk 48.

In a third phase of actuation of the brakes, any increase in the force exerted by the driver on the control rod 30 generates an increase in the boost force exerted on the piston, thus resulting in an increase of the pedal reaction exerted by the disk 48 on the plunger 28, then in contact with one another.

During the second and third phases, the front face of the shutter 34 and the seats 20a and 28a are virtually aligned. This position is called the "position of equilibrium".

From the foregoing explanations it will be understood clearly that the jump of the booster, that is to say the value of the abrupt increase in the output force, and the moment when it occurs during the movement of the plunger 28 in relation to the piston 20, hence the second phase described above, is of paramount importance for the operation of the booster. However, as already mentioned, depending on the production tolerances of the various component parts of the booster and on the component materials of the reaction disk, there can be considerable differences in the value of the jump from one booster to another in series production.

According to the present invention, there is provided an adjustment process for reducing or even canceling the range of variation of the booster jump attributable to the various production tolerances, or even for obtaining a booster capable of having any desired jump value, this being achieved without having to dismount the booster.

According to the present invention, the piston 20 of the booster is produced in two parts, more specifically in its rear tubular part. The central part of the piston 20, in which the stepped bore 26 is formed, has a cylindrical extension 50 directed rearwards, and the rear tubular part forms a stepped bore 52, the rear end of which has an internal thread 54. A sleeve or element 56 is arranged sealingly in the bore 52. More specifically, the sealing between the sleeve 56 and the piston 20 is ensured by a gasket 58 in the rear part of larger diameter of the bore 52, by a gasket 60 in the front part of smaller diameter of the bore 52 and by a gasket 62 around the cylindrical extension 50, about which the sleeve 56 engages sealingly. The sleeve 56 possesses, at its rear end, an external thread 55 intended for interacting with the thread 54 formed at the rear end of the rear tubular part of the piston 20, so as to fix the piston 20 and the sleeve 56 together.

The sleeve 56 has orifices 64 in its part located between the gaskets 58 and 60, so as to put the space located within the sleeve 56 in communication with the passage 33. The front end of the sleeve 56 possesses a part 66 which extends radially inwards in the direction of the axis X—X and which delimits a circular orifice about the plunger 28 and of diameter larger than that of the latter.

The flexible sleeve, the front end of which forms the shutter 34, the cup 36, the spring 38 and the spring 42 are arranged inside the sleeve 56 in a similar way to that of conventional boosters. It will therefore be appreciated that the booster produced according to the invention can operate in the way described above, with the exception that the valve seat 20a is formed on the front part 66 of the sleeve 56 carried by the piston 20 and not on the piston 20 itself.

In contrast, once the booster is completely assembled, it will be very easy to modify the value of its jump, either because this has been deemed unacceptable or because the intention is to give it a particular value, this being possible without the need to dismount the booster.

In fact, it will be understood clearly from the foregoing explanations that by screwing or unscrewing, to a greater or lesser extent, the sleeve 56 in the rear tubular part of the piston 20, it is possible to vary the distance between the annular front face 20b of the piston 20 and the annular valve seat 20a carried by the central part of the piston 20.

Under these conditions, the first phase of actuation of the brake, as described above, is identical, the only effect of the force exerted on the rod 30 being to bring the shutter 34 nearer to the seat 20a of the piston 20. The front chamber 16 and rear chamber 18 remain isolated from one another and the push rod 46 does not experience any displacement.

In contrast, it was seen above that during the second phase of actuation of the brake, that is to say when the shutter 34 is in contact with the seats 20a of the piston 20 and 28a of the plunger, air at atmospheric pressure is admitted into the rear chamber, the effect of this being to generate a boost force on the piston 20 which is thus displaced abruptly forwards, until the induced deformation of the reaction disk causes the rear face of the latter to come into contact with the front face of the plunger 28, that is to say to fill the space or the play present at rest between these two faces, represented by the distance between the front face of the plunger 28b and the annular front surface 20b of the piston 20.

It will therefore be understood clearly that, under these conditions, the greater the distance between this annular front surface 20b and the seat 20a of the piston, the greater the distance between the annular front surface 20b of the piston and the front face of the plunger 28 at the start of the second operating phase, and therefore the higher the jump will be. Conversely, if, at the start of the second operating phase, the shutter 34 comes into contact with the two seats 20a and 28a when the front face of the plunger is very near the rear face of the reaction disk, the jump will be low.

It will thus be seen that, as a result of the rotation of the sleeve 56 in relation to the rear tubular part of the piston 20, causing it to be screwed or unscrewed, the seat 20a of the piston 20 is moved nearer to or away from its annular front face 20b. The jump of the booster is therefore modified as desired, this being possible without the need to dismount it.

The jump of a booster, as just described, can then be adjusted according to a very simple process which will now be explained. The jump of the booster has been defined as being the abrupt pressure increase occurring when the shutter 34 comes into contact with the two seats 20a and 28a, this pressure increase resulting in a sudden boost force exerted by the push rod 46.

With the booster of which the jump is to be adjusted being considered at rest, a force equal to the boost force corresponding to the desired jump of the booster is applied to its push rod 46 from outside. The effect of applying this external force is to subject the reaction disk to a deformation of the same amount as during normal operation by action on the control rod 30.

When the sleeve 56 has been screwed to its maximum extent into the rear tubular part of the piston 20, so as to move the seat 20a as far away from the shutter 34 as possible, a push is then exerted on the control rod 30 until the front face of the plunger 28 comes into contact with the reaction disk 48 already deformed. This coming into contact can easily be detected by any means, for example with a strain gauge. With the seat 20a of the piston 20 then being as near as possible to its annular front face 20b, it is then clear that the shutter 34 is in contact only with the seat of the plunger 28 and that the front chamber 16 and rear chamber 18 are in communication.

The rear end of the sleeve 56 is then closed off sealingly, with a sealed passage for the control rod 30. The air contained in the space within the sleeve 56 around the control rod 30 is therefore at atmospheric pressure. The sleeve 56 is then unscrewed so as to bring the seat 20a nearer to the shutter 34, already in contact with the seat 28a of the plunger. At the moment when the seat 20a comes into contact with the shutter 34 and thereafter moves the latter slightly away from the seat 28a of the plunger, communication is then established between the rear chamber 18, which was under a vacuum, and the space limited within the sleeve 56 which will consequently experience an abrupt decrease of pressure. It is sufficient to detect this pressure drop by any means, for example a pressure gauge, in order to know that the two shutter seats 20a and 28a are aligned.

The rotation of the sleeve 56 is then stopped, the booster thus being set at the desired jump value. It is now sufficient merely to remove the seal which was arranged at the rear end of the sleeve 56 and to cease applying stresses to the control rod 30 and to the push rod 46, so that the booster thus adjusted can be available.

Of course, once the jump is set at the desired value, it is possible to immobilize the sleeve 56 in terms of rotation relative to the tubular rear part of the piston 20, for example by screwing a washer 70, then functioning as a locknut, on to the rear end of the sleeve 56 projecting from the tubular part of the piston 20.

A simple and effective process for adjusting the jump of a booster quickly and at low outlay, and without any work carried out inside the booster, has thus indeed been described. This process can easily be automated for robotized series production. A booster, the jump of which can be adjusted, without the need to dismount it, simply, quickly and reliably according to the process of the invention, has also been described.

What we claim is:

1. A process for adjusting the value of the jump of a brake-booster, in which booster is mounted movably a hollow booster piston and a control rod carrying a plunger seated in the booster piston, a rear end of the plunger forming a first annular valve seat concentric with a second annular valve seat carried by the, booster piston, the first annular valve seat and second annular valve seat interacting with an annular shutter carried by the booster piston, and a reaction disk being interposed between an annular front face of the booster piston and a rear face of a push rod, said process comprising the following steps:

applying to the push rod a force equal to a boost force corresponding to a desired jump of the booster, moving the second annular valve seat of the booster piston away from the shutter, putting a front face of the plunger and a rear face of the reaction disk into contact and maintaining this contact during the next step, putting the second annular valve seat of the booster piston into contact with the shutter in order to move said shutter away from said first annular valve seat, and releasing said force.

2. The process according to claim 1, wherein the second annular valve seat of the booster piston is moved away from the shutter as a result of the rotation of a sleeve in relation to the booster piston.

3. The process according to claim 1, wherein the second annular valve seat of the booster piston is put into contact with the shutter as a result of the rotation of a sleeve in relation to the booster piston.

4. The process according to claim 1, wherein the putting of the second annular valve seat of the booster piston into contact with the shutter is detected by the measurement of a pressure drop.

5. A brake-booster, in which is mounted movably a hollow booster piston and a control rod carrying a plunger seated in a rear tubular part of the piston, a rear end of the plunger forming a first annular valve seat concentric with a second annular valve seat carried by the booster piston, the first annular valve seat and second annular valve seat interacting with an annular shutter carried by the booster piston, and a reaction disk being interposed between an annular front face of the booster piston and a rear face of a push rod, the second annular valve seat in formed on an element adjustable relation to the booster piston.

6. The booster according to claim 5, wherein the second annular valve seat is formed on an element movable in relation to the booster piston.

7. The booster according to claim 6, wherein said element movable in relation to the booster piston is a sleeve arranged in a rear tubular part of the piston.

8. The booster according to claim 7, wherein said sleeve possesses a thread interacting with a thread formed in the rear tubular part of the piston.

9. The booster according to claim 7, wherein the annular shutter is inside the sleeve.

10. The booster according to claim 9, wherein the adjustment of the position of the second annular valve seat in relation to the annular front face of the piston is obtained as a result of the rotation of the sleeve in the rear tubular part of the piston.

* * * * *